United States Patent [19]

Peyrat

[11] Patent Number: 5,053,777
[45] Date of Patent: Oct. 1, 1991

[54] MEASUREMENT OF THE STABILITY OF A RADAR IN TRANSMISSION/RECEPTION

[75] Inventor: André Peyrat, Montrouge, France

[73] Assignee: Thomson-CSF, Puteaux, France

[21] Appl. No.: 496,868

[22] Filed: Mar. 21, 1990

[30] Foreign Application Priority Data

Mar. 31, 1989 [FR] France ................................. 89 04253

[51] Int. Cl.5 ............................................. G01S 7/40
[52] U.S. Cl. ................................................... 342/173
[58] Field of Search ........................ 342/165, 173, 174

[56] References Cited

U.S. PATENT DOCUMENTS

| 3,950,750 | 4/1976 | Churchill et al. |
| 4,003,054 | 1/1977 | Goldstone |
| 4,626,856 | 12/1986 | Pierson et al. ........................ 342/174 |

FOREIGN PATENT DOCUMENTS 664021 1/1988 Switzerland.

OTHER PUBLICATIONS

The Following is a list of pending applications and registrations by applicant: U.S. Pat. No. 3,984,788, granted 10/15/76; and U.S. appln. Ser. No. 06/503,601, filed 6/13/83.

Primary Examiner—Mark Hellner
Attorney, Agent, or Firm—Roland Plottel

[57] ABSTRACT

The measurement of the stability of a radar in transmission/reception includes two steps. During a first step, video voltage signals leaving a phase detector of the radar receiver are measured at significant instants where said signals are capable of undergoing fluctuations. These signals come from a signal reflected by a fixed target and received by the radar. During a second step, an additional signal with pre-determined phase and amplitude is superimposed on the received signal in the receiver, in order to substantially cancel the stable parts of the voltage signals and to measure the fluctuations of the voltage signals thus obtained at said significant instants. The instrument to measure these fluctuations advantageously includes analog/digital converters with a small number of bits.

8 Claims, 4 Drawing Sheets

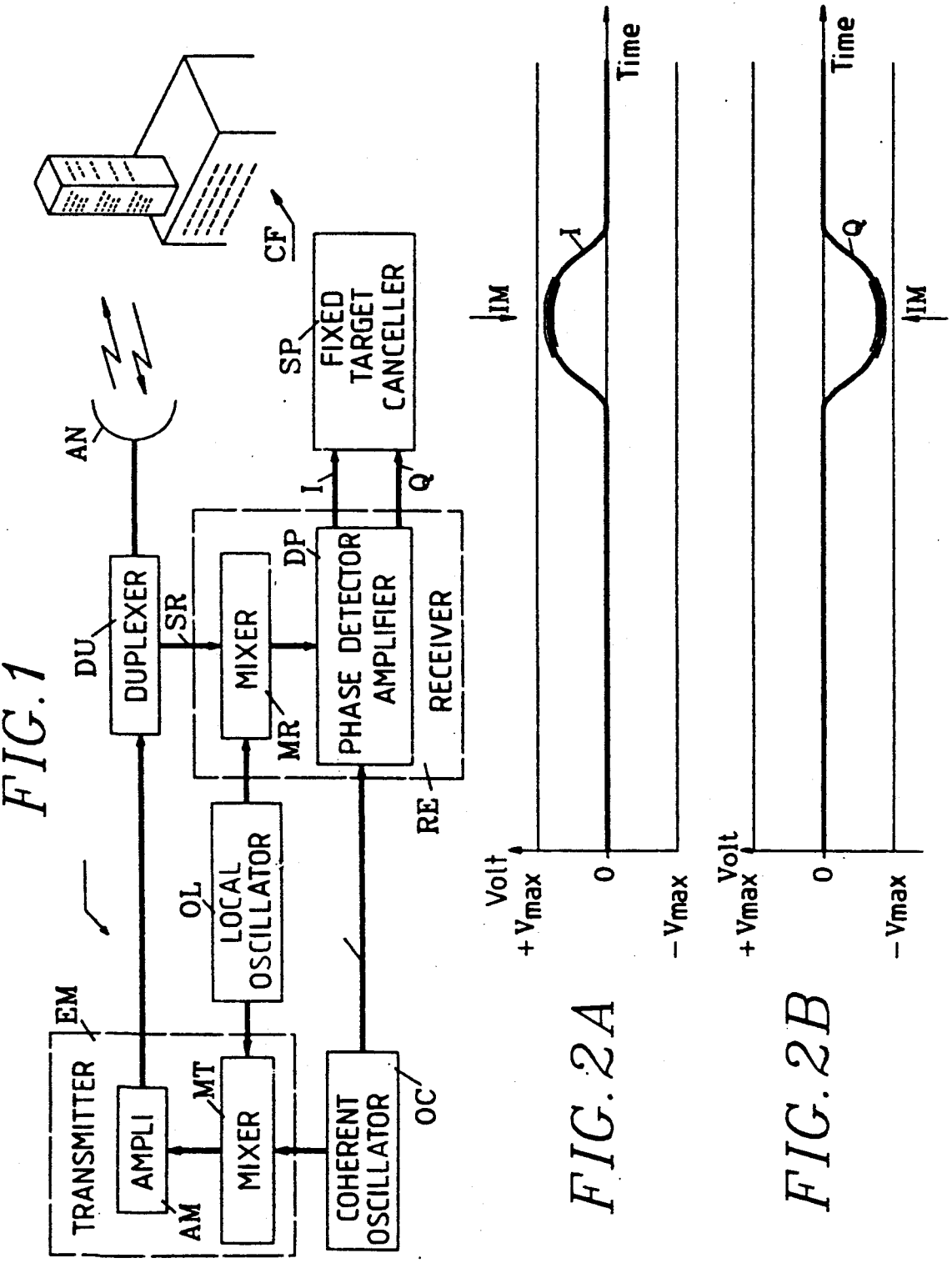

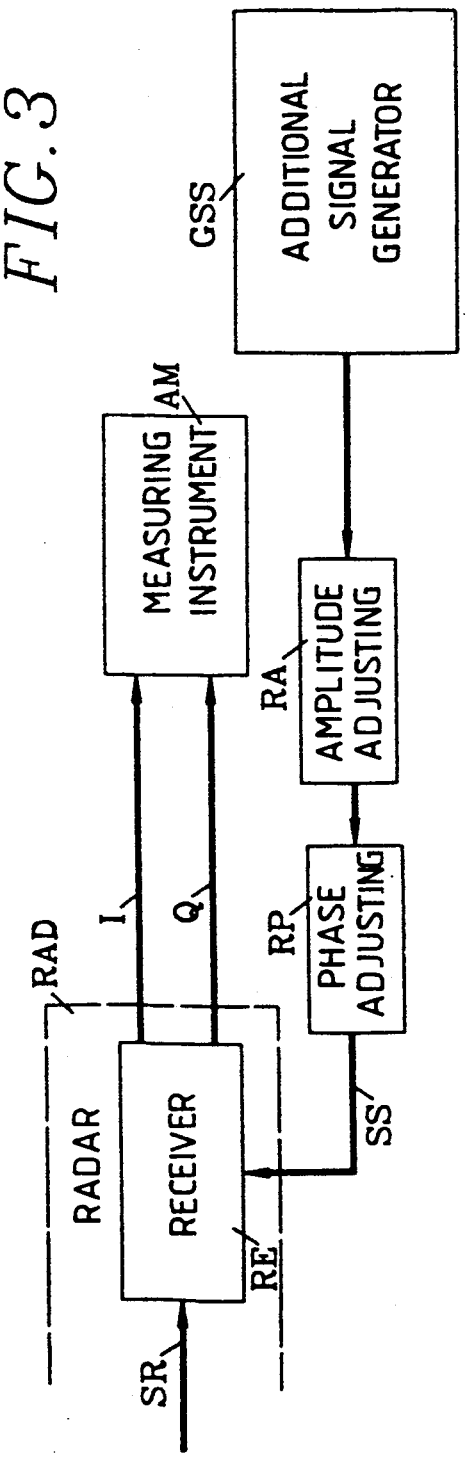
FIG. 3
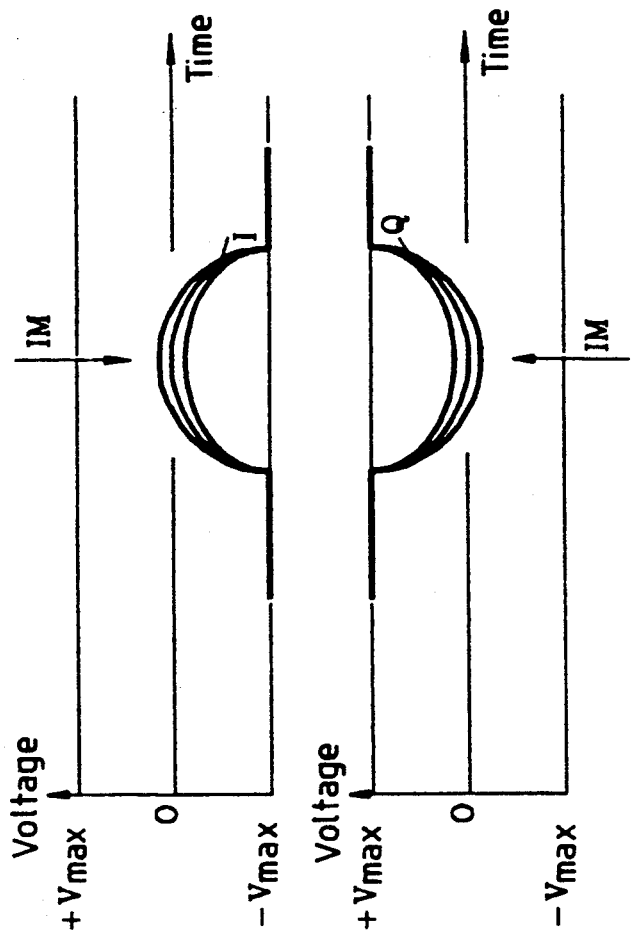
FIG. 4A
FIG. 4B

MEASUREMENT OF THE STABILITY OF A RADAR IN TRANSMISSION/RECEPTION

BACKGROUND OF THE INVENTION

1. Field of the Invention

The present invention relates to radar techniques. More particularly, it concerns radars set up on the ground and used for the detection and tracking of moving targets of any kind such as, for example, aircraft in flight, especially for airport approach control.

The invention can be applied to any radar system for the identifying of moving targets in which moving targets, that are useful in principle, and fixed targets, in principle not useful, are differentiated by using the variations in amplitude and phase of the received signal on several successive pulse recurrences of the radar. In radars such as this, the distinction between moving targets and fixed targets in a fixed target canceller at output of the receiver of the radar is limited by the variations in amplitude and phase of the signal caused by the radar itself, both in the transmission circuits and in the reception circuits of the radar.

The variations in amplitude and phase of the received signal have been used, since 1950 at least, to distinguish moving targets from fixed targets. A useful reference on this subject can be found in Merril I. SKOLNIK, *Radar Handbook*, McGRAW-HILL, and especially in chapter 17 thereof, by William W. SHRADER, pages 17-2 to 17-50. Very early on, the specialists discovered that a technique such as this imposes a degree of stability in amplitude and phase, on the transmitter/receiver set of the radar, that is compatible with the overall performances sought. This stability in transmission and reception has therefore quickly become one of the major technical characteristics of the transmitter/receiver set of radars of this type, called radars that are "coherent" or "made coherent", depending on their structure, and the specialists have therefore striven to specify and measure it.

Appropriate methods of measurement have been found and special instruments have been built to perform this type of measurement.

The method most commonly used at present consists in memorizing, in digital form, two video voltages I and Q of the receiver in the presence of a fixed target. One of the voltages, I, is called a phase video voltage and the other voltage, Q, is called a video voltage in quadrature. The fixed target is either real or simulated by the injection, into the receiver, of a delayed or non-delayed sample of the transmitted signal (cf. FIG. 1). As the radar transmits with the specified frequency of renewal, a sequence of pairs (I, Q) is thus formed. Each pair (I, Q) is converted into two words of digitized samples, each having a number of bits corresponding to the analog-digital converters used, which are generally those included in the canceller of the radar itself. The variations observed in the successive samples represent the instability measured and are analyzed either in the temporal field, according to a computation of means and standard deviations, or in the frequency field according to a computation by Fourier transform and analysis of the spectrum obtained.

The computation by Fourier transform is generally preferred because its results are direct and convenient to interpret in the increasingly common case where modern radars process the signals received by a bank of Doppler filters.

The measurement of the stability of a radar in transmission/reception is a difficult operation since it requires the measurement of small variations in a voltage signal having a high amplitude. The instruments used for the measurement have been improved in recent years to make them compatible with the increased performance characteristics of the radars as regards stability.

At present, the stability levels in demand are such that the measuring instruments used up to now do not give the quality and precision required to make the measurement with a sufficient margin between the value of the parameter to be measured and the faults introduced by the measuring instrument itself.

In particular, the two analog-digital converters used in most of the radars and receiving the two video voltage signals I and Q have an encoding dynamic range that is limited by the number of significant bits at output. This number of bits is itself limited by considerations of cost and technical and technological feasibility.

The number of significant bits of the analog-digital converters commonly used is, at present, equal to 12 bits. This corresponds to $2^{12}=4096$ voltage levels between limit voltages $-V_{MAX}$ and $+V_{MAX}$ on each of the two voltage paths I and Q. It is assumed that, to encode the noise and other weak signals properly, these signals should occupy at least three or four encoding levels on either side of zero. The result thereof is a measuring dynamic range of the order of 4096 divided by $2\times3=6$ or $2\times4=8$ giving, in decibels: 20 log (4096/(6 or 8))=54 or 57 dB.

This dynamic range is insufficient to measure the stabilities of the radar system of the order of $-60$ dB or more, and even more insufficient to measure the partial contributions resulting therefrom, which are of the order of $-65$ to $-70$ dB.

A known approach to this problem of measurement consists in making use of analog/digital converters having a greater number of bits. This rise in the number of bits increases the dynamic range of measurement to the detriment of the cost of the measuring system, especially when an example of the measuring system has to be given with each radar delivered, or when the measuring system has to be integrated into the radar itself.

SUMMARY OF THE INVENTION

The present invention therefore seeks to provide a method and system for measuring the stability in transmission/reception of a radar, overcoming the above-mentioned drawbacks of the prior art and, in particular, providing measuring quality and precision that are appreciably greater while, at the same time, using analog/digital converters with a small number of bits.

To this end, the invention proposes a method for measuring the stability of a radar in transmission/reception, including a first step during which voltage signals leaving a phase detector of the radar receiver are measured at significant instants where said signals are liable to undergo fluctuations, said signals coming from a signal reflected by a fixed target and received by the radar, wherein said method includes a second step during which an additional signal, with pre-determined phase and amplitude, is superimposed on the received signal in the receiver in order to substantially cancel the stable parts of the voltage signals and to measure the fluctuations of the voltage signals thus obtained at said significant instants.

The invention further proposes a measurement system for the implementation of the invention, wherein the radar comprises a received signal receiver producing two video voltage signals in quadrature sent towards an analog/digital fixed target canceller, and towards analog/digital conversion means included in said system, wherein said system comprises means to produce said additional signal through means for adjusting amplitude and phase during the second step, said additional signal being applied to a received signal input of the radar receiver.

BRIEF DESCRIPTION OF THE DRAWINGS

Other advantages and characteristics of the invention will appear more clearly from the following description, made with reference to the corresponding appended drawings, of which:

FIG. 1 is a schematic bloc diagram of a prior art radar with power amplification;

FIGS. 2A and 2B show two signals with fluctuations leaving a phase detector of the radar receiver of FIG. 1;

FIG. 3 gives a schematic view of the stability measuring system of the radar according to the invention;

FIGS. 4A and 4B show two signals with fluctuations going out of the phase detector of the radar after injection of an additional signal by the measuring system;

DESCRIPTION OF THE PREFERRED EMBODIMENTS

Figure 5:
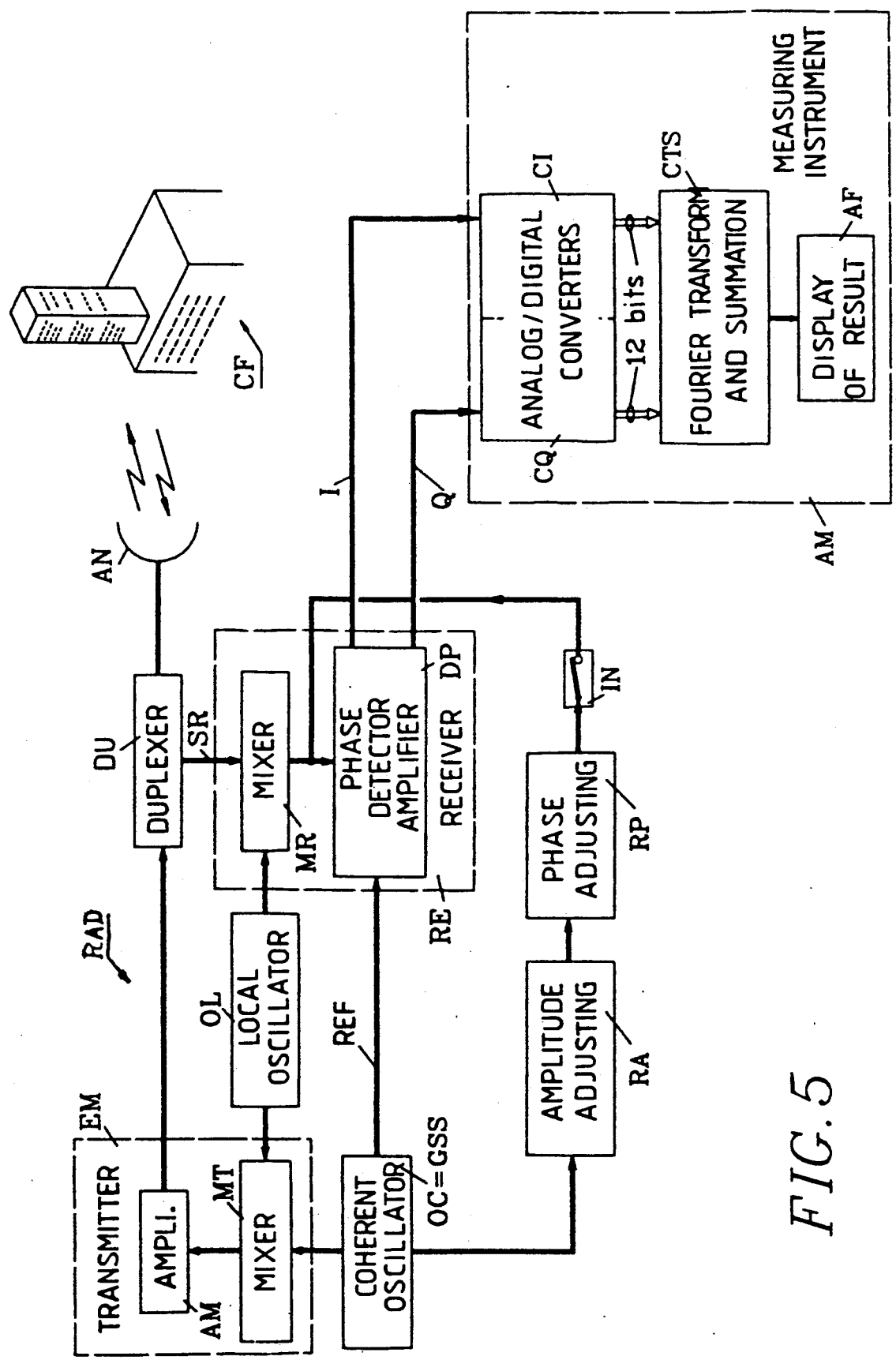
FIG. 5 is a schematic block diagram of a practical embodiment of the measuring system for the radar of FIG. 1.

FIG. 1 shows the main components of a known coherent radar RAD of the type with power amplifier. The radar RAD essentially has a transmitter of recurrent pulses EM, a receiver of recurrent pulses RE, a duplexer DU interconnected between an output of the transmitter EM and an input of the receiver RE and connected to an antenna AN, and two oscillators OL and OC.

The first oscillator OL is a stabilized local oscillator transmitting radio-frequency pulses towards two mixers MT and MR, respectively included in the transmitter EM and the receiver RE.

In the transmitter EM, the mixer MT receives pulses from the second oscillator OC through a second input. This second oscillator OC forms a coherent oscillator at intermediate frequency, producing pulses used as a phase reference in the receiver RE. The mixer MT transmits recurrent trains of radio-frequency pulses which are amplified by an amplifier AM and transmitted by the antenna AN through the duplexer DU.

At reception, the pulse signal SR received through the antenna AN and the duplexer DU, following the reflection of the pulses transmitted to the targets, is mixed with pulses coming from the local oscillator OL in the mixer MR to be transposed to the intermediate frequency. Then, in the receiver RE, the received signal at intermediate frequency, is applied to an amplifier input of a phase detector DP connected by a second input to the coherent oscillator OC. The phase detector DP compares the phases of the received signal SR with the reference signal REF produced by the oscillator OC in order to transmit an output signal which is a function of the relative phase between the received signal and the reference signal and of the amplitude of the received signal.

The phase detector is then connected to a fixed target canceller SP designed to remove the echoes coming from fixed targets, to display only the echoes of the moving targets on the radar screen. In the simplest embodiment, the canceller SP memorizes, in a delay line, the recurrent pulse trains of the received signal at each interval of emission, and compares them two by two in a subtractor. When two successive trains are equal, the signal leaving the subtractor is null and corresponds to a fixed target. On the contrary, for a moving target, the pulse trains received have their relative phase modified, owing to the shift of the moving target, and the signal leaving the subtractor is not null and indicates a moving target.

In practice, when digital techniques are used in the canceller, the phase detector DP has two output channels I and Q transmitting video analog signals in quadrature to two analog/digital converters at input of the canceller SP. As already stated, the invention refers to this type of radar with digital cancellation.

FIGS. 2A and 2B show the video signals I and Q when the antenna is pointed to a fixed target CF, such as a building. These two figures, like the following FIGS. 4A and 4B, show a superimposition of the fluctuations of each of the video signals I and Q for various recurrent trains received. The fluctuations have been highly exaggerated because of the need to depict them with respect to the voltage limits $V_{MAX}$ and $-V_{MAX}$ of the signals I and Q. These fluctuations to be measured according to the invention are chiefly due to the instabilities of the transmission and reception circuits of the radar. It can be seen, in FIGS. 2A and 2B, that the amplitude of the signals I and Q is limited by the peak levels $V_{MAX}$ and $-V_{MAX}$ at output of the phase detector DP.

According to the invention, to measure the fluctuations of the signals I and Q, we use a measuring instrument AM, receiving the signals I and Q of the phase detector DP of the receiver RE, and means to inject a pre-determined additional signal GSS into the receiver RE. As shown schematically in FIG. 3, the injection means include an additional signal generator GSS which applies the additional signal to the radar receiver RE through an amplitude adjusting circuit RA and a phase adjusting circuit RP, mounted in series.

The amplitude and the phase of the additional signal are adjusted so that the additional signal SS substantially cancels the stable parts in the signals I and Q while, at the same time, leaving their fluctuations intact from recurrence to recurrence, by the superimposition of the additional signal S to the received signal SR. Under these conditions, as shown in FIGS. 4A and 4B, the superimposition of signals causes a fading, or at least a significant reduction in the level of the voltages in quadrature I and Q at the significant instants IM where the measurements are made in the apparatus AM.

The additional signal SS produced by the generator GSS may be a pulse signal or a continuous signal at the intermediate frequency or at the transmission frequency of the radar.

Thus, the fluctuations of the signals I and Q are close to zero voltage, as shown in FIGS. 4A and 4B, and are no longer limited by the limit peak voltages $V_{MAX}$ and $-V_{MAX}$.

Each output signal I, Q of the receiver RE may thus be amplified at will while, at the same time, remaining within the dynamic range permitted by the measuring instrument AM, especially the dynamic range permitted by two analog-digital converters included in this measuring instrument. The faults introduced by the measuring instrument itself become small as compared with the measured signals which have been amplified.

In this way, the measurement of the physical magnitude itself, such as voltage, is separated from the measurement of its variations. Since the additional signal SS used is very stable from recurrence to recurrence, it introduces no additional instabilities and will keep the fluctuations, forming the unwanted signal that it is sought to measure, intact.

The method according to the invention does away with the need to measure small fluctuations of a physical magnitude in the presence of this magnitude. The physical magnitude here is a voltage measured simultaneously at two points, such as the output I and the output Q of the radar receiver RE. The fluctuations of these voltages during several radar recurrences give access to the parameter that it is sought to measure.

In the prior art, the fact of simultaneously measuring the voltages and their variations presents the difficulties already described.

The method of the invention assumes the measurement of the value of the voltages I and Q during the first step, then the adjustment of the amplitude and phase of the additional signal SS and the measurement of the variations of the corresponding voltages I and Q during a second step. Hence, the signal to be measured is applied to the measuring instrument with a sufficient level for the measurement to have high precision and high reproducibility. All that should be done is to see to it, during the adjusting operations, that the fluctuations remain within the range of permissible voltages at input of the measuring instrument AM.

The method of the invention is simple and costs little. It lends itself to manual implementation, which suffices in most cases, as well as to automated implementation.

According to a preferred embodiment shown in FIG. 5, the additional signal is a continuous signal SS at the intermediate frequency. In this case, the generator GSS is formed by the coherent oscillator OC of the radar RAD itself. The amplitude and phase adjusting circuits RA and RP are series connected with a switch IN between an output of the oscillator OC and the amplification input of the phase detector DP.

As is also shown in FIG. 5, the measuring instrument AM has two analog/digital converters CI and CQ receiving the analog video signals I and Q of the phase detector DP. Each converter CI, CQ does a sampling, at the significant measuring instants, of the signals I and Q in 12-bit words. Then, in the measuring instrument AM, the variations between samples are analyzed frequentially in undergoing a 128-point Fourier transform and a summation in power of the 127 frequency lines obtained at a non-null frequency by means of a conversion and summation circuit CTS. The result of the measurement in decibels is displayed in a suitable display device AF.

The measurement is made, for example, on a real fixed target CF, the antenna AF of the radar having been immobilized in the direction of the fixed cable used. The video voltages I and Q, shown at output of the phase detector DP, included in the radar receiver RE, at the instant corresponding to the distance of said fixed target, represent the echo returning from this target.

Figure 6B:
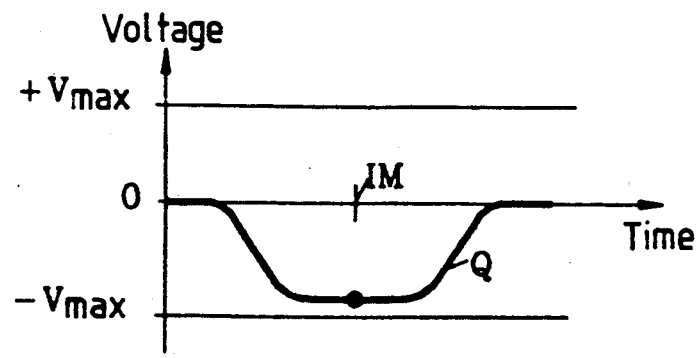
FIGS. 6A and 6B show two signals coming out of the phase detector during a first step of the measuring method according to the invention.
Figure 6A:
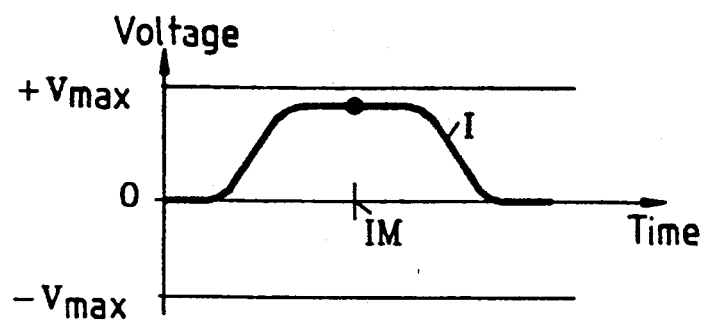
Figure 7B:
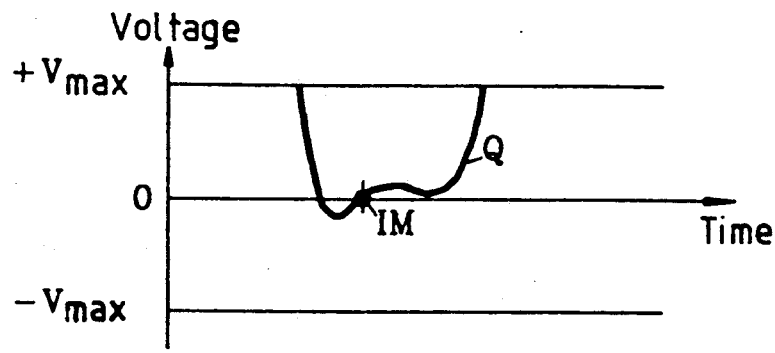
FIGS. 7A and 7B show two signals coming out of the phase detector during a second step of the measuring method according to the invention.
Figure 7A:
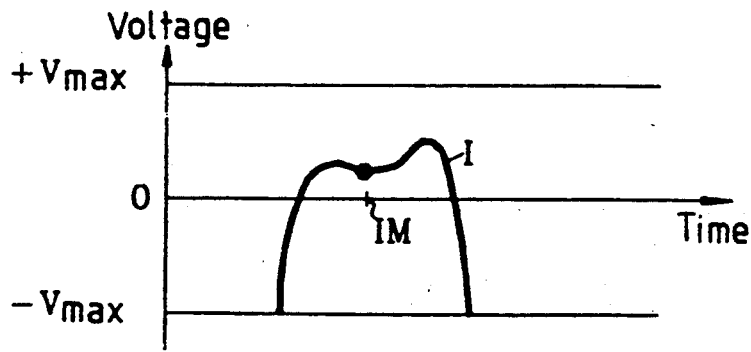

During a first step, the switch IN is open and the receiver RE of the radar works like that of FIG. 1. However, the amplification gain of the receiver is adjusted in such a way that the voltages I and Q, irrespectively of their fluctuations, substantially undergo neither saturation nor restriction in the receiver. This enables them to be measured by the instrument AM. The voltages I and Q, measured during this first step, represent the so-called "useful signal", as shown in FIGS. 6A and 6B.

During a second step, the gain of the receiver RE is increased by x dB. The value of x of not of vital importance, and it is chosen at the operator's discretion. The switch IN is then closed, as shown in FIG. 5. A part of the signal at intermediate frequency, produced by the oscillator OC, is injected as a supplementary signal SS, into the amplification input of the receiver, after a suitable adjustment of amplitude and phase of the signal SS in the circuits RA and RP, so as to cause a near cancellation of the voltages I and Q at the instants IM when the measurement is done. In practice, these phase and amplitude adjustments give the additional signal a phase that is substantially in opposition with the received signal SR and an amplitude that is substantially equal to that of the received signal.

The instrument AM measures the power of the stray signal corresponding to the fluctuations of the voltages I and Q. The measurement is thus done on a stray signal amplified by x dB. To obtain the ratio between the power of the stray signal and that of the useful signal, it suffices, before computing the ratio of the measurements, to reduce the result of the measurement of the stray signal by x dB or, in what amounts to the same thing, to increase the result of the measurement of the useful signal by x dB.

The implementation of the method according to the invention, in this preferred embodiment, makes it possible to obtain a capacity of measurement of the stability of the radar in transmission/reception at a specified level of $-60$ dB, with high precision without using a specialized measuring instrument. In relaxing the requisite constraints of precision, such as those relating to analog/digital conversion, the method of the invention enables the measurement to be made with the normal functions of the radar. The result thereof is a significant reduction in the cost of the entire system, without reducing its performance characteristics.

What is claimed is:

1. A method for measuring the stability of a radar in transmission/reception, including a first step during which voltage signals leaving a phase detector of the radar receiver are measured at significant instants where said signals are liable to undergo fluctuations, said signals coming from a signal reflected by a fixed target and received by the radar, wherein said method includes a second step during which an additional signal, with predetermined phase and amplitude, is superimposed on the received signal in the receiver in order to substantially cancel the stable parts of the voltage signals and to allow for the measurement of the fluctuations of the voltage signals thus obtained at said significant instants.

2. A method according to claim 1, wherein said additional signal is a pulse or continuous signal, at the intermediate frequency of the radar or at the transmission frequency of the radar.

3. A method according to claim 1 wherein, during the first step, the gain in amplification of the radar receiver is adjusted so that said voltage signals undergo no limitation in voltage.

4. A method according to claim 1, wherein the measurements of voltage signals during the first and second steps and their exploitation are done in the temporal field or in the frequency field.

5. A measurement system for measuring the stability of a radar in transmission/reception for implementation of the method according to any one of claims 1 to 4, wherein the radar comprises a received signal receiver producing two video voltage signals in quadrature sent towards an analog/digital fixed target canceller, and towards analog/digital conversion means included in said system, wherein said system comprises means to produce said additional signal through means for adjusting amplitude and phase during the second step, and said additional signal being applied to a received signal input of the radar receiver.

6. A system according to claim 5, wherein the means to produce the additional signal are formed by a coherent oscillator at intermediate frequency included in the radar and acting as a phase reference for the phase detector, and wherein the amplitude and phase adjusting means are connected to an amplification input of the phase detector, preferably through a switch.

7. A system according to claim 5, wherein the conversion means are two analog/digital converters respectively receiving the video voltage signals.

8. A system according to claim 5, wherein said system comprises means connected to said conversion means to make an analysis, in the frequency field, of the digital signals coming from the video voltage signals.

* * * * *